Jan. 28, 1969   H. MENELL   3,424,634
TIRE BUILDING MACHINE
Filed March 22, 1965   Sheet 1 of 3
fig. 1
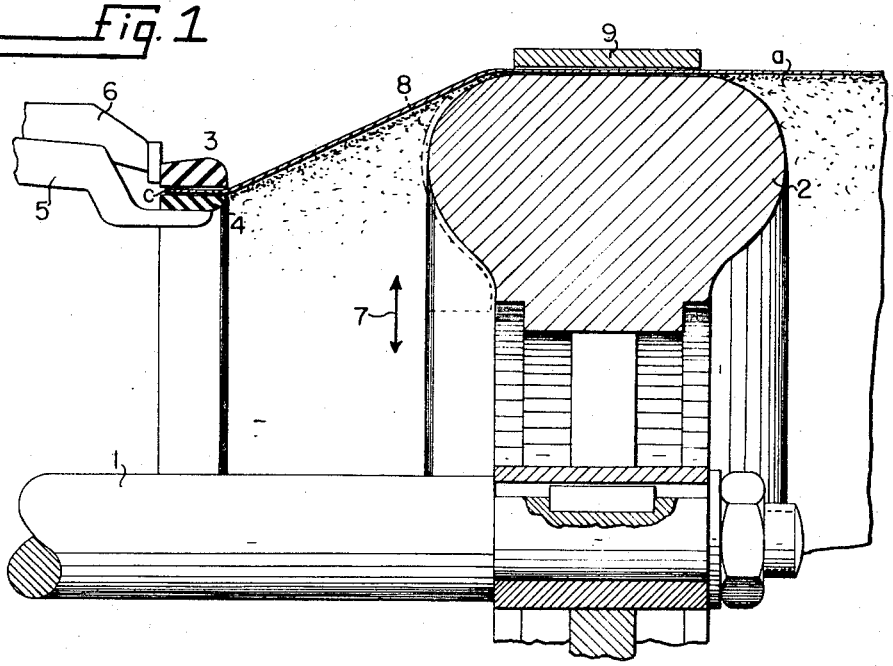
fig. 2
fig. 3
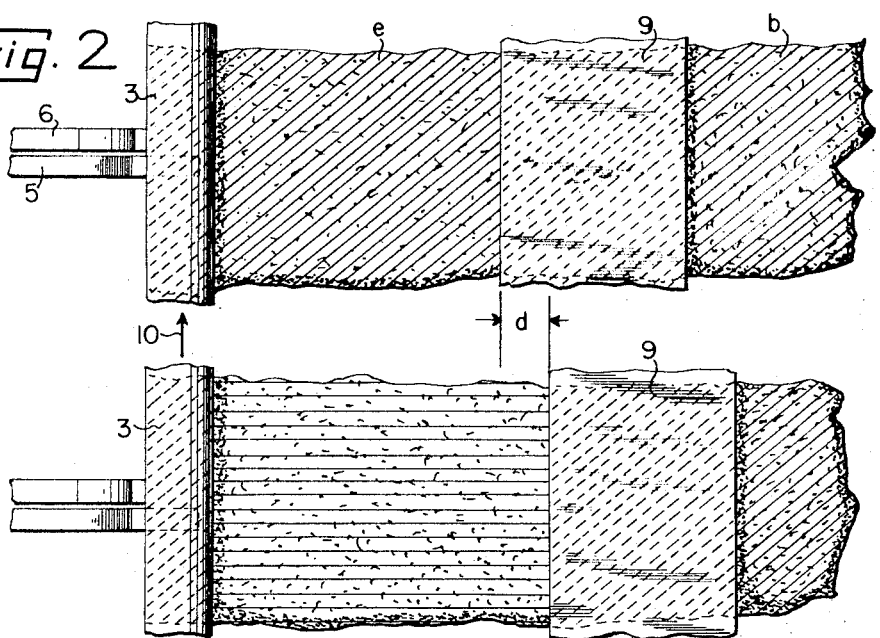
INVENTOR.
HANS MENELL
BY

United States Patent Office 3,424,634
Patented Jan. 28, 1969

3,424,634
TIRE BUILDING MACHINE
Hans Menell, Ahlem, Hannover, Germany, assignor to Continental Gummi-Werke Aktiengesellschaft, Hannover, Germany
Filed Mar. 22, 1965, Ser. No. 441,459
Claims priority, application Germany, Mar. 20, 1964,
C 32,463
U.S. Cl. 156—133        7 Claims
Int. Cl. B29h 17/10

ABSTRACT OF THE DISCLOSURE

The method and apparatus for making a tire having threads in the zenith portion at an acute angle to the circumference and with radial thread in the side walls by placing the fabric plies so that the threads extend laterally at said acute angle and so that marginal portions extend beyond the tire drum surface an equal distance on each side and while fixing their position on the drum contacting portion, rotating the tire with respect to the edges of the margins, thus effecting a change of the angle of the margin to the final radial direction, and turning down the margins to form the side walls of the tire.

---

The present invention relates to a tire building machine with a building core and radially movable grippers for grasping the marginal fabric portions placed on and laterally protruding from the building core.

As is well known, the said grippers which may be designed as coaxial rubber rings variable in diameter, are adapted to grasp the marginal portions of the tire fabric in order to be able to place those fabric portions which protrude from said building core against the lateral surfaces of the later. In order to be able to obtain the desired fold-free placement of the laterally protruding fabric portions, provisions are necessary which in addition to permitting a radial movement of the grippers inwardly in the direction toward the axis of the core, also allow a reduction in the distance between the core and the grippers. This reduction in the distance may be brought about by an axial displacement of the core relative to the grippers or by an axial movement of the grippers superimposed upon the radial movement thereof. The operation of such a tire building machine thus always requires a reduction of the distance between the grippers and the core.

The tire fabric to be processed is always placed upon the building core in such a way that the direction in which the individual threads extend will correspond to the desired direction of the threads in the tire. Thus, when carcass tires in unfiinished condition are to be produced, correspondingly bias-cut cord fabric layers are employed.

It is an object of the present invention to provide a tire building machine of the above mentioned general type which will permit the manufacture of tires which with regard to the buildup of the carcass differ considerably from heretofore known tires.

It is another object of this invention to provide a tire building machine which will permit a simplified buildup of tires that correspond, as far as their properties are concerned, to the well-known belted tires with carcass threads extending from bead to bead at a right angle with regard to the circumferential direction of the tire.

It is also an object of this invention to provide a tire building machine which will permit the building up of tires with cord threads extending from bead to bead while those cord thread sections which are located below the tread strip extend in an inclined direction with regard to the circumferential direction of the tire, whereas those cord thread sections which are located in the lateral walls of the tire extend at least approximately at a right angle with regard to the circumferential direction of the tire.

These and other objects and advantages of the invention will appear more clearly from the following specification in connection with the accompanying drawings, in which:

FIG. 1 diagrammatically illustrates in longitudinal section a portion of a tire building machine according to the present invention;

FIG. 2 is a top view of FIG. 1 at the start of the building of the tire;

FIG. 3 shows a top view of FIG. 1 after a relative rotation between the tire core and the grippers;

FIG. 4a shows a development of the encircled portion of FIG. 4;

Figure 4:
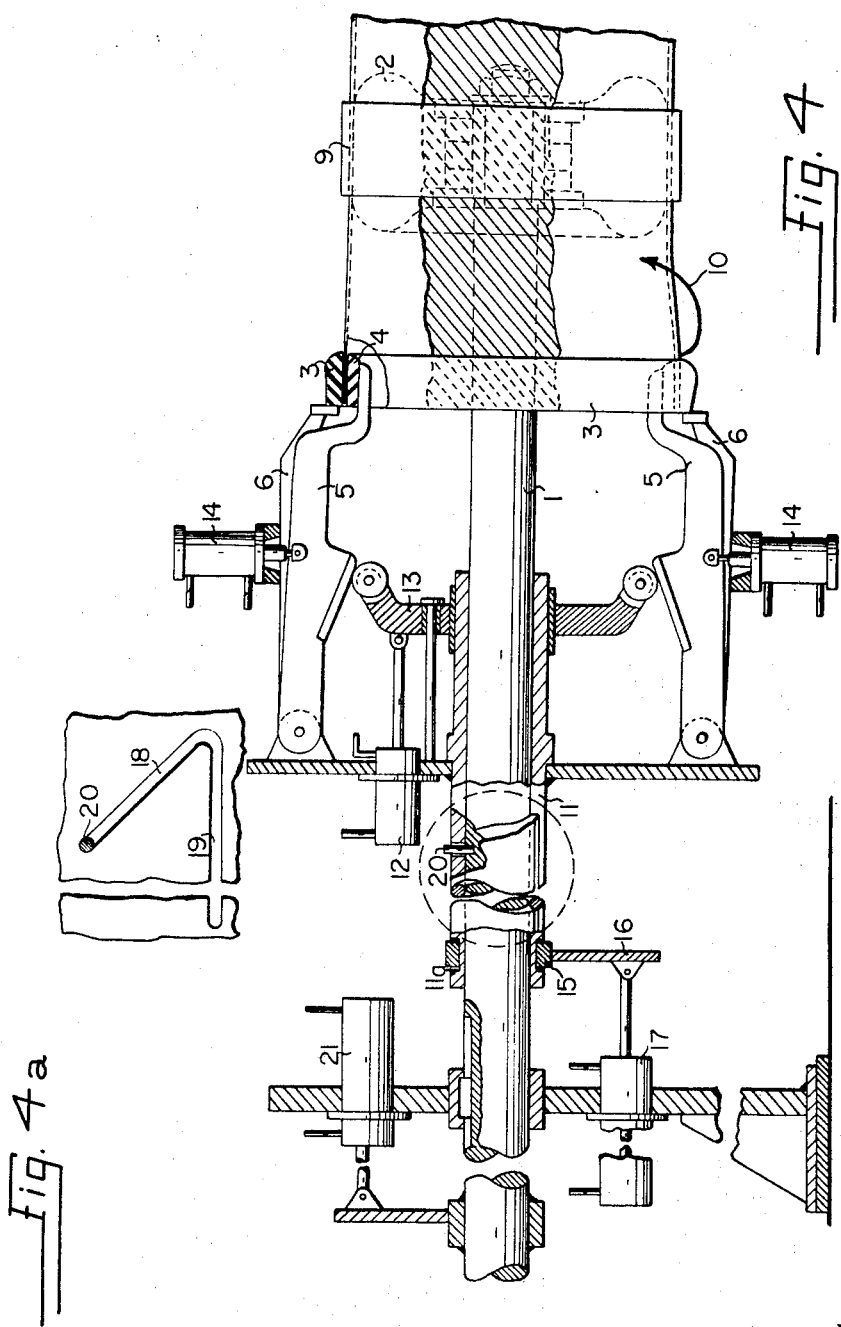
FIG. 4 illustrates in greater detail than FIG. 1 the tire building machine according to the invention including a control mechanism effecting a turning movement of the grippers relative to the tire core in conformity with the axial distance between the grippers and the tire core.

The build-up of a tire in conformity with the present invention is started with the employment of a carcass fabric having cord threads cut on a bias. After such carcass fabric has been placed upon the core and has been fixed thereon, for instance by a sleeve surrounding said carcass fabric, a tensioning operation is initiated by turning the core and the grippers relative to each other while the distance between the tire building core or drum and the grippers will be increased. During this relative movement between grippers and drum, those cord threads which are located in the free section between the tire building core and the grippers are transformed from an inclined position with regard to the circumferential direction of the core into a position in which they are at least approximately at a right angle with regard to the circumferential direction of the core. These two operations or transformations, namely, the relative rotation between core and grippers and the increase in distance between grippers and core or drum may be carried out simultaneously or, if desired, successively.

If desired, a special drive for effecting the relative rotation between grippers and core may be omitted if the core or drum or the grippers are so journalled that they can easily be rotated. In such an instance, the increase in distance between grippers and drum will automatically bring about a relative rotation between gripper and drum due to the fact that the cord threads have been placed upon the core in such a way that the threads thereon are at an incline with regard to the circuferential direction of the core and a lateral pull upon the laterally protruding portions of the cord threads will produce a power component in a direction perpendicular to the axis of rotation of the drum.

Referring now to the drawing in detail, the tire building machine shown in FIG. 1 comprises a shaft 1 having rotatably journalled thereon a core or drum 2. The arrangement of FIG. 1 furthermore comprises a pair of grippers 3 and 4 arranged in axially spaced relationship with regard to core 2. The grippers 3 and 4, which may consist of coaxially arranged rubber belts, may be controlled by arms 6 and 5, respectively. By means of these arms, the grippers may be so actuated, for instance by varying the diameter of the rubber bands 3 and 4, that selectively the grippers are opened or closed. Arms 5 and 6 are furthermore adapted to move rubber bands 3 and 4 when in closing position in radial direction upwardly or outwardly, as indicated by the double arrow 7 while said rubber bands 3 and 4 are moved together to bring about the desired change in diameter.

By means of said grippers, it is also possible to transform the tire fabric *a* with its inclined cord threads *b* which is supported by said core 2, in such a way that when rubber rings 3 and 4 have reached a certain end position, the fabric portion laterally protruding from core 2 will have assumed the shape shown in dash-lines in FIG. 1 and designated with the reference numeral 8 so that the tire fabric *a* engages the lateral surfaces of core 2.

In connection with the present invention, it is important that the laterally protruding tire fabric *a* which surrounds core 2 has the cord threads *b* in the above-mentioned inclined position, and that first the tire fabric *a* is fixed on drum 2 by a clamping sleeve 9 so that relative movements of that fabric section which is surrounded by sleeve 9, with regard to core 2 cannot occur.

After the rubber rings 3, 4 have grasped a marginal portion *c* of tire fabric *a* and have firmly grasped said marginal portion, a relative rotation of grippers 3, 4 with regard to core 2 is effected, as indicated by the arrows 10. Such a relative movement may be brought about by a templet control to be described later, in conformity with the axial distance between core 2 and rubber rings 3, 4. At the same time, the distance between said rubber rings 3, 4 on one hand and core 2 on the other hand is increased while, advantageously, the rubber rings 3, 4 are fixed in axial direction, and the said increase in distance is effected by an axial movement of core 2 by a distance *d*. This brings about a deformation of tire fabric *a*. The free section *e* which is not clamped in and pertains to the tire fabric *a* is tensioned in such a way that cord threads *b* are no longer at an incline but at a right angle with regard to the circumferential direction of core 2. This deformation of cord threads *b* will not affect the marginal portion *c* nor that tire fabric section which is engaged and clamped by sleeve 9. The cord threads in these sections thus maintain their inclined direction with regard to the circumferential direction of the core, as has been clearly shown in FIG. 3. The relative movement between core 2 and grippers 3, 4 may produce a deformation of the tire fabric *a* in such a way that a bend occurs at the edges of sleeve 9 or the edge of core 2. Such a bend, however, is not harmful because the outer diameter of core 2 will be so selected that the outer circumference of the unfinished tire during the processing in its mold will undergo an enlargement. Consequently, due to the stretching at the outer circumference of the unfinished tire, a gradual merging toward section *e* will occur. The finished tire will therefore have no bends, but bending radii which depend on the final shape which the unfinished tire will acquire in the vulcanizing mold.

The control mechanism for the tire building machine according to the invention is illustrated in greater detail in FIG. 4. A tubular member 11 is arranged on shaft 1 and carries the various elements required for controlling the movements of the grippers 3 and 4 and also for radially displacing the same. A working cylinder 12 is adapted to effect an axial displacement of a cage 13 which in turn controls the radial spacing of grippers 3 and 4 from shaft 1. Grippers 3 and 4 are, as has been brought out above, formed by pretensioned rubber rings so that the lever arms 5 are always in firm engagement with cage 13. There is furthermore provided a working cylinder 14 adapted to bring about a relative movement of lever 6 carrying the rubber rings 3 with regard to the lever arm 5 carrying the rubber ring 4, whereby opening and closing of the gripper claw is made possible.

In the left-hand portion of tubular member 11 (with regard to the drawing) a circumferential groove 11*a* is provided which has rotatably journalled therein an annular member 15 having an extension 16 engaged by the piston rod of a cylinder piston system 17. Tubular member 11 is furthermore provided with an inclined slot 18 (see FIG. 4*a*) merging into a longitudinal slot 19.

Furthermore, shaft 1 is provided with a pin 20 adapted to extend into slots 18 and 19. If the cylinder piston system 17 is actuated, tubular member 11 is rotated in the direction of the arrow 10 of FIG. 3 in view of the inclined slot 18 provided therein while the spacing of the tubular member 11 and the grippers 3 and 4 connected therewith from core 2 is increased.

The control mechanism according to FIG. 4 is furthermore provided with a cylinder piston system 21 for axially displacing shaft 1. In this way, it is possible, upon actuation of the cylinder piston systems 17 and 21 to adjust any desired relative movements between the grippers 3 and 4 and core 2.

Summarizing the situation, it may be mentioned that the increase in the distance between the grippers 3 and 4 and tire core 2 is effected by the provision of the inclined slot 18 in connection with pin 20. The angle of inclination of the slot 18 determines the amount of the relative rotation. In FIG. 4*a* this angle of inclination amounts to approximately 45°.

Figure 5:
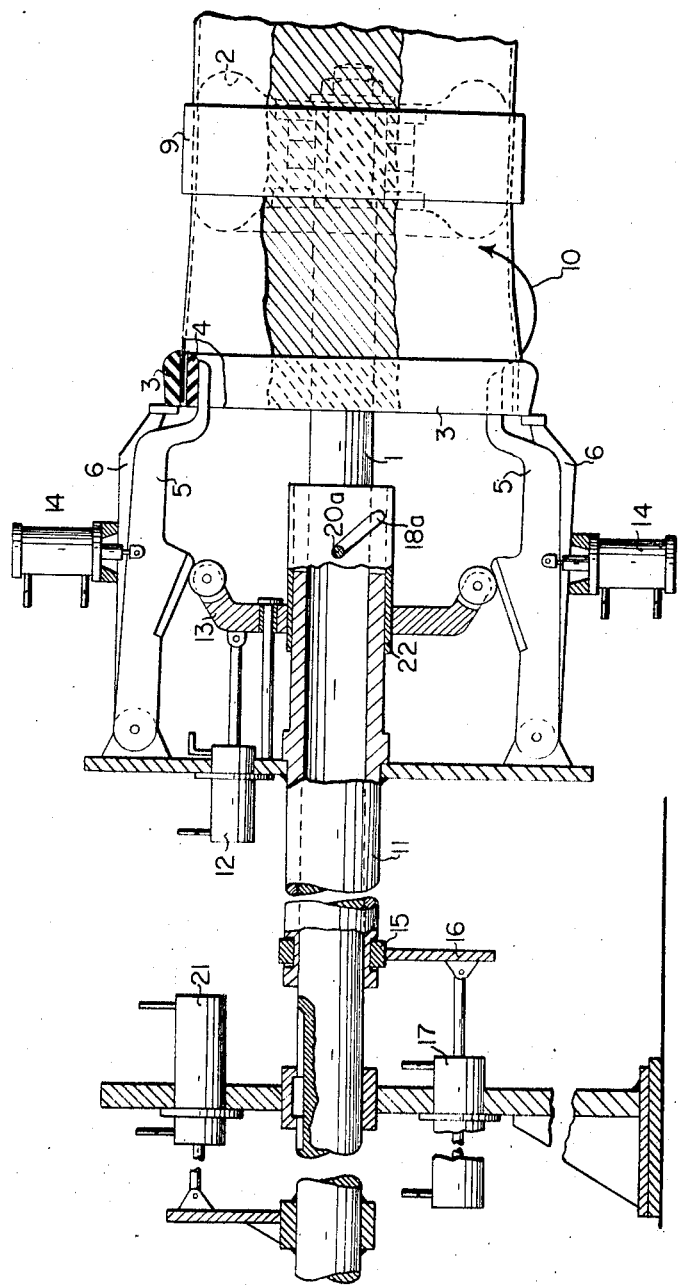
FIG. 5 is a view similar to that of FIG. 4 but differing therefrom in that the control mechanism effects a rotation of the tire core in conformity with the radial movement of the grippers.

After section *e* has been deformed, the placing of the tire fabric on the lateral walls of core 2 will be effected in a manner known per se, as, for instance, described in assignee's U.S. Patent No. 3,081,814 in connection with FIGS. 3 to 5. The longitudinal slot 19 makes it possible to displace the tubular member 11 and thereby the grippers 3 and 4 in longitudinal direction in the direction towards the core 2. The axial distance between rubber rings 3, 4 and core 2 will be so reduced that the fabric will in its end position occupy the position shown in dash-lines in FIG. 1 and designated with the reference numeral 8. After this operation has been completed, core 2 may be turned in such a way that now the other laterally protruding fabric section (the right-hand section with regard to FIG. 1) can be processed in the manner described above. It will be understood from the above, that during the relative turning movement between grippers and core 2, an increase in the axial distance between grippers and core 2 will occur.

It is to be understood that the tire building machine described above does not necessarily have to be operated in the manner described but may also be operated in the following manner:

After the tire fabric *a* has been placed on core 2 and has been fixed therein by sleeve 9, rubber rings 3, 4 will grasp section *c*. Section *e* will then be tensioned without, however, changing the axial distance between the grippers and core 2. Thereupon, while further tensioning section *e*, the latter is placed against the lateral portions of core 2 by a radial movement of the grippers, more specifically, by a decrease in the diameter of rubber rings 3 and 4. During this operation, core 2 is rotated in conformity with the movement of the grippers in the direction toward shaft 1. This operation of the machine will bring about that no bends will occur at the upper marginal portion of section *e*. The relative turning movement of cores and grippers may be controlled by templets or the like.

A control device for this purpose is illustrated in FIG. 5, in which the relative rotation is effected in conformity with the movement of the grippers. As is well known, the radial movement of the grippers 3 and 4 depends upon the position of the cage 13 which is journalled on tubular member 11 through the intervention of an axially adjustable sleeve 22. If this sleeve is provided with an inclined slot 18*a* similar to the inclined slot 18 shown in FIG. 4*a*, and if, furthermore, shaft 1 has connected thereto a pin 20*a* similar to the pin 20 shown in FIG. 4*a*, upon a radial movement of the grippers 3 and 4, i.e., an axial movement of cage 13, the pair of grippers 3, 4 is rotated relative to shaft 1. In this way, a tensioning and change of the angle in the fabric section *e* is effected. Care is to be taken that during said relative turning movement and the simultaneously effected tensioning and lateral placing movement, section *e* of the fabric will remain taut. In the present instance, the effective increase in distance between grippers and core will be effected by the radial movement of the grippers. This brings about the advantage that by suitable selection and design of the mentioned control device, it is possible to influence the merging between the inclined section of the cord threads below sleeve 9 with the desired radial extension of the cord threads in section *e*. Thus, large merging radii or radii of curvature of the individual threads of fabric *a* will be possible.

It is, of course, to be understood that the present invention is, by no means, limited to the particular arrangement shown in the drawings, but also comprises any modifications within the scope of the appended claims. It is also to be understood that the term "thread" as it appears in the specification and the claims also includes wires.

What I claim is:

1. In a method of making a tire with a carcass having thread sections in the zenith portion of the tire at an acute angle with regard to the circumferential direction of the tire and also having thread sections in the side walls of the tire which extend at substantially a right angle with regard to the circumferential direction of the tire, the steps of: placing the tire fabric to be used in the tire on a tire building drum so that the threads of said tire fabric extend at said acute angle with regard to the circumferential direction of said drum while substantially equal portions of said tire fabric protrude laterally from said drum, holding the drum contacting portion of said tire fabric on said drum, grasping the free marginal portion of one of said laterally protruding portions, and effecting a relative rotation between said grasped marginal portion of said fabric and the fabric portion on said drum in a direction to change the angle of the threads in said marginal portion toward a position of right angles to the circumference of said drum while increasing the distance between said grasped marginal portion and said portion on said drum in comformity with said relative motion of the drum and the means grasping the free marginal edges.

2. A method according to claim 1, in which the step of increasing the distance between said grasped marginal portion of said fabric and the fabric portion on said drum is accomplished by decreasing the diameter of said grasped free marginal portions during said relative rotation.

3. A method according to claim 1 which includes the step of pressing the said fabric portion on the drum tightly against the drum to prevent movement thereof relative to the drum.

4. A tire building machine, which includes: a tire building drum, gripper means substantially coaxially arranged with regard to said drum and axially movable relative thereto, said drum and said gripper means being rotatable relative to each other, motor means interposed between said gripper means and said drum for effecting said relative axial movement thereof, and cooperating elements of cam and follower means connected respectively to said gripper means and said drum operable positively to cause controlled relative rotation between gripper means and drum in response to changes in the axial distance between said gripper means and said drum.

5. A tire building machine according to claim 4 in which said cam and follower means provides for relative rotation of said gripper means and said drum during a first relative axial movement thereof in one direction and prevents relative rotation of said gripper means and said drum during a following second relative axial movement thereof in the opposite direction.

6. A tire building machine according to claim 5 which includes means to clamp the drum engaging portion of fabric placed on said drum to the said drum while the margin of the fabric is gripped by said gripper means whereby the relative rotation of said gripper means and drum will change the angularity of the threads of said fabric at the side edges of the portion of said fabric which is clamped to said drum.

7. A tire building machine according to claim 5 in which said drum has a shaft fixed thereto and said gripper means has a sleeve fixed thereto and reciprocably and rotatably mounted on said shaft, said elements of a cam and follower means comprising a pin projecting from the shaft and a groove in said sleeve into which said pin extends, said groove comprising a first portion which spirals about said sleeve for controlling said relative rotation of said gripper means and drum during said first relative axial movement thereof in said one direction and a second portion extending axially of said sleeve from one end of said spiral portion and preventing relative rotation of said gripper means and drums during said second axial movement thereof in said opposite direction.

References Cited

UNITED STATES PATENTS

| 2,231,359 | 2/1941 | Day _____ 156—123 X |
| 2,954,818 | 10/1960 | Frohlich et al. _____ 156—394 |
| 2,967,564 | 1/1961 | Niclas et al. _____ 156—394 |
| 3,081,814 | 3/1963 | Beckadolph et al. _____ 156—394 |

EARL M. BERGERT, *Primary Examiner.*

C. B. COSBY, *Assistant Examiner.*

U.S. Cl. X.R.

156—414